(12) United States Patent
Zu et al.

(10) Patent No.: US 12,256,123 B2
(45) Date of Patent: Mar. 18, 2025

(54) BEHAVIOR CONTROL METHOD AND APPARATUS FOR VIRTUAL LIVE STREAMING CHARACTER

(71) Applicant: Alibaba (China) Co., Ltd., Binjiang District Hangzhou (CN)

(72) Inventors: Xinxing Zu, Hangzhou (CN); Long Zhang, Hangzhou (CN); Zhongzhou Zhao, Hangzhou (CN); Ji Zhang, Hangzhou (CN); Zhiyong Xiao, Hangzhou (CN)

(73) Assignee: ALIBABA (CHINA) CO., LTD., Binjiang District Hangzhou (CN)

( * ) Notice: Subject to any disclaimer, the term of this patent is extended or adjusted under 35 U.S.C. 154(b) by 243 days.

(21) Appl. No.: 17/743,491

(22) Filed: May 13, 2022

(65) Prior Publication Data

US 2022/0377414 A1 Nov. 24, 2022

(30) Foreign Application Priority Data

May 20, 2021 (CN) .......................... 202110553150.5

(51) Int. Cl.
*H04N 21/442* (2011.01)
*H04N 21/2187* (2011.01)
*H04N 21/466* (2011.01)

(52) U.S. Cl.
CPC ... *H04N 21/44218* (2013.01); *H04N 21/2187* (2013.01); *H04N 21/4667* (2013.01)

(58) Field of Classification Search
None
See application file for complete search history.

(56) References Cited

U.S. PATENT DOCUMENTS

| | | |
|---|---|---|
| 10,826,963 B2 | 11/2020 | Jain |
| 11,284,137 B2 | 3/2022 | Todd |
| 11,420,125 B2* | 8/2022 | Nelson .................. A63F 13/352 |
| 2016/0277802 A1* | 9/2016 | Bernstein ......... H04N 21/44213 |
| 2018/0103298 A1* | 4/2018 | Taylor ............. H04N 21/47815 |
| 2018/0160153 A1 | 6/2018 | Rajewski |
| 2018/0160180 A1* | 6/2018 | Kedenburg, III .. H04N 21/4753 |

(Continued)

*Primary Examiner* — Alexander Q Huerta
(74) *Attorney, Agent, or Firm* — James J. DeCarlo; Greenberg Traurig, LLP

(57) ABSTRACT

The disclosed embodiments relate to a behavior control method and apparatus for a virtual live streaming character. In an embodiment, a method comprises: acquiring viewer behavior data of a live streaming service, and determining atmosphere data of the live streaming service according to the viewer behavior data; acquiring scenario data of the live streaming service, using the viewer behavior data, the atmosphere data, and the scenario data as behavior decision input data, and performing multi-modal feedback behavior decision-making based on the behavior decision input data to acquire a behavior control instruction; and performing a corresponding behavior operation according to the behavior control instruction. The disclosed embodiments combine existing knowledge and newly added behavior, achieves targeted behavior decision-making and control, improves the accuracy of virtual human behavior control, and considers both flexibility and comprehensiveness, thereby greatly improving the quality of virtual human behavior, and improving viewing experience of users.

18 Claims, 5 Drawing Sheets

(56) References Cited

U.S. PATENT DOCUMENTS

| | | | |
|---|---|---|---|
| 2018/0316939 A1 | 11/2018 | Todd | |
| 2018/0316941 A1 | 11/2018 | Todd | |
| 2018/0316942 A1 | 11/2018 | Todd | |
| 2018/0316943 A1 | 11/2018 | Todd | |
| 2018/0316944 A1 | 11/2018 | Todd | |
| 2018/0316946 A1 | 11/2018 | Todd | |
| 2018/0316947 A1 | 11/2018 | Todd | |
| 2018/0316948 A1 | 11/2018 | Todd | |
| 2019/0014390 A1 | 1/2019 | Holtz et al. | |
| 2019/0058928 A1* | 2/2019 | Halper | H04N 21/26258 |
| 2019/0079941 A1* | 3/2019 | Sarkar | G06F 16/7864 |
| 2019/0102929 A1 | 4/2019 | David et al. | |
| 2019/0110096 A1 | 4/2019 | Shaw et al. | |
| 2019/0394248 A1* | 12/2019 | Danker | H04L 67/75 |
| 2021/0067845 A1* | 3/2021 | Qu | H04N 21/4784 |
| 2021/0218931 A1 | 7/2021 | Karafin et al. | |
| 2021/0258650 A1* | 8/2021 | Wagner | G06Q 10/10 |
| 2021/0299541 A1 | 9/2021 | Karafin et al. | |
| 2021/0406850 A1* | 12/2021 | Herring | G06Q 20/123 |
| 2022/0070243 A1* | 3/2022 | Hartnett | H04N 21/44222 |
| 2022/0159315 A1* | 5/2022 | Liang | G06Q 30/0208 |
| 2023/0093192 A1* | 3/2023 | Liu | A63F 13/792 |
| | | | 600/38 |
| 2023/0199231 A1* | 6/2023 | Fredette | H04N 21/21805 |
| | | | 725/105 |

\* cited by examiner

BEHAVIOR CONTROL METHOD AND APPARATUS FOR VIRTUAL LIVE STREAMING CHARACTER

CROSS-REFERENCE TO RELATED APPLICATIONS

This application claims priority to Chinese Patent Application No. 202110553150.5 filed on May 20, 2021, the contents of which are incorporated by reference.

BACKGROUND

Technical Field

The disclosure relates to the technical field of data processing and particularly to a behavior control method and apparatus for a virtual live streaming character.

Description of the Related Art

With the development of Internet technology, virtual human-based platforms such as live streaming and intelligent customer service have emerged over time. The use of a virtual human can facilitate management and reduce labor costs. Therefore, the virtual human is more and more widely used. In current systems, generally, virtual human behavior decision is performed based on knowledge or a behavior tree, or the virtual human behavior decision is acquired completely using online learning. However, the two methods have some defects: in the virtual human behavior decision method employing knowledge or a behavior tree, a decision is performed only based on predetermined knowledge or a behavior tree, a decision direction cannot be automatically adjusted, and a targeted decision cannot be performed based on each virtual human and each application scenario; the virtual human behavior decision method employing online learning cannot consider both existing knowledge and newly added behavior. The above virtual human behavior decision methods have low accuracy and lack flexibility and comprehensiveness, thereby greatly reducing the quality of virtual human behavior, reducing the viewing experience of a user, and hindering the development of the virtual human-based platform.

BRIEF SUMMARY

Embodiments of the disclosure provide a behavior control method and apparatus for a virtual live streaming character.

In the first aspect, an embodiment of the disclosure provides a behavior control method for a virtual live streaming character.

Specifically, the behavior control method for a virtual live streaming character includes: acquiring viewer behavior data of a live streaming service, determining atmosphere data of the live streaming service according to the viewer behavior data; acquiring scenario data of the live streaming service, using the viewer behavior data, the atmosphere data, and the scenario data as behavior decision input data, and performing multi-modal feedback behavior decision-making based on the behavior decision input data to acquire a behavior control instruction; and performing a corresponding behavior operation according to the behavior control instruction.

In an embodiment, the determining atmosphere data of the live streaming service according to the viewer behavior data includes: acquiring real-time behaviors of viewers; collecting real-time behavior data of the viewers when the real-time behaviors of the viewers meets a pre-configured triggering condition; processing the real-time behavior data of the viewers to acquire intention evaluation data and emotion evaluation data; and calculating the frequency of occurrence of the intention evaluation data and the emotion evaluation data, and using one or more pieces of intention evaluation data and emotion evaluation data having the highest frequency of occurrence as the atmosphere data of the live streaming service.

In an embodiment, the performing multi-modal feedback behavior decision-making based on the behavior decision input data to acquire a behavior control instruction includes: determining whether the behavior decision input data is pre-configured behavior decision input data in a pre-configured behavior decision input data set, wherein the pre-configured behavior decision input data set includes the pre-configured behavior decision input data and a pre-configured behavior control instruction corresponding to the pre-configured behavior decision input data; in response to the behavior decision input data being the pre-configured behavior decision input data in the pre-configured behavior decision input data set, acquiring the pre-configured behavior control instruction corresponding to the pre-configured behavior decision input data, and using the same as the behavior control instruction; and in response to the behavior decision input data not being the pre-configured behavior decision input data in the pre-configured behavior decision input data set, inputting the behavior decision input data into a pre-trained behavior decision model to acquire behavior decision result data, and generating the behavior control instruction based on the behavior decision result data.

In an embodiment, inputting the behavior decision input data into a pre-trained behavior decision model to acquire behavior decision data and generating the behavior control instruction based on the behavior decision data includes: inputting the behavior decision input data into the pre-trained behavior decision model to acquire multiple behavior decision results and probabilities corresponding thereto and generating the behavior control instruction based on a behavior decision result having the highest probability.

In an embodiment, the method further includes training the behavior decision model.

In an embodiment, the training of the behavior decision model includes determining an initial behavior decision model; acquiring a historical behavior decision data set, wherein the historical behavior decision data set includes historical behavior decision input data and historical behavior decision result data corresponding to the historical behavior decision input data; and training the initial behavior decision model by using the historical behavior decision input data as an input and using the historical behavior decision result data corresponding thereto as an output to acquire the behavior decision model.

In an embodiment, the method further includes using the behavior decision input data and the behavior decision result data corresponding thereto as new training data and adding the new training data to a historical behavior decision data set of the behavior decision model to train the behavior decision model.

In an embodiment, the method further includes correcting the behavior control instruction generated based on the behavior decision result data to acquire a corrected behavior control instruction.

In an embodiment, the correcting the behavior control instruction generated based on the behavior decision result data includes: acquiring a correction behavior decision input data set, wherein the correction behavior decision input data set includes correction behavior decision input data, a correction condition, and a correction behavior control instruction corresponding to the correction behavior decision input data; determining whether the behavior decision input data is the correction behavior decision input data in the correction behavior decision input data set, and determining whether the correction condition is met; and in response to the behavior decision input data being the correction behavior decision input data in the correction behavior decision input data set and the correction condition being met, acquiring the correction behavior control instruction corresponding to the correction behavior decision input data, and using the same as a behavior control instruction acquired after correcting the behavior control instruction.

In an embodiment, the performing a corresponding behavior operation according to the behavior control instruction includes calling, according to the behavior control instruction, a behavior component corresponding to the virtual live streaming character to perform the behavior operation, and/or controlling, according to the behavior control instruction, the virtual live streaming character to perform the corresponding behavior operation.

In a second aspect, an embodiment of the disclosure provides a behavior control apparatus for a virtual live streaming character.

Specifically, the behavior control apparatus for a virtual live streaming character includes a determination module, configured to acquire viewer behavior data of a live streaming service and determine atmosphere data of the live streaming service according to the viewer behavior data; a decision-making module, configured to acquire scenario data of the live streaming service, use the viewer behavior data, the atmosphere data, and the scenario data as behavior decision input data, and perform multi-modal feedback behavior decision-making based on the behavior decision input data to acquire a behavior control instruction; and a performing module, configured to perform a corresponding behavior operation according to the behavior control instruction.

In an embodiment, a portion in the determination module for determining atmosphere data of the live streaming service according to the viewer behavior data is configured to: acquire the real-time behaviors of viewers; collect real-time behavior data of the viewers when the real-time behaviors of the viewers meets a pre-configured triggering condition; process the real-time behavior data of the viewers to acquire intention evaluation data and emotion evaluation data, and calculate the frequency of occurrence of the intention evaluation data and the emotion evaluation data, and use one or more pieces of intention evaluation data and emotion evaluation data having the highest frequency of occurrence as the atmosphere data of the live streaming service.

In an embodiment, a portion in the decision-making module for performing multi-modal feedback behavior decision-making based on the behavior decision input data to acquire a behavior control instruction is configured to: determine whether the behavior decision input data is pre-configured behavior decision input data in a pre-configured behavior decision input data set, wherein the pre-configured behavior decision input data set includes the pre-configured behavior decision input data and a pre-configured behavior control instruction corresponding to the pre-configured behavior decision input data; in response to the behavior decision input data being the pre-configured behavior decision input data in the pre-configured behavior decision input data set, acquire the pre-configured behavior control instruction corresponding to the pre-configured behavior decision input data, and use the same as the behavior control instruction; and in response to the behavior decision input data being not the pre-configured behavior decision input data in the pre-configured behavior decision input data set, input the behavior decision input data into a pre-trained behavior decision model to acquire behavior decision result data, and generate the behavior control instruction based on the behavior decision result data.

In an embodiment, a portion for inputting the behavior decision input data into a pre-trained behavior decision model to acquire behavior decision data and generating the behavior control instruction based on the behavior decision data is configured to input the behavior decision input data into the pre-trained behavior decision model to acquire multiple behavior decision results and probabilities corresponding thereto; and generate the behavior control instruction based on a behavior decision result having the highest probability.

In an embodiment, the apparatus further includes a training module, configured to train the behavior decision model.

In an embodiment, the training module is configured to determine an initial behavior decision model; acquire a historical behavior decision data set, wherein the historical behavior decision data set includes historical behavior decision input data and historical behavior decision result data corresponding to the historical behavior decision input data, and train the initial behavior decision model by using the historical behavior decision input data as an input and using the historical behavior decision result data corresponding thereto as an output to acquire the behavior decision model.

In an embodiment, the training module is further configured to use the behavior decision input data and the behavior decision result data corresponding thereto as new training data and add the new training data to a historical behavior decision data set of the behavior decision model to train the behavior decision model.

In an embodiment, the apparatus further includes a correction module, configured to correct the behavior control instruction generated based on the behavior decision result data to acquire a corrected behavior control instruction.

In an embodiment, the correction module is configured to acquire a correction behavior decision input data set, wherein the correction behavior decision input data set includes correction behavior decision input data, a correction condition, and a correction behavior control instruction corresponding to the correction behavior decision input data; determine whether the behavior decision input data is the correction behavior decision input data in the correction behavior decision input data set, and determine whether the correction condition is met; and in response to the behavior decision input data being the correction behavior decision input data in the correction behavior decision input data set and the correction condition being met, acquire the correction behavior control instruction corresponding to the correction behavior decision input data, and use the same as a behavior control instruction acquired after correcting the behavior control instruction.

In an embodiment, the performing module is configured to call, according to the behavior control instruction, a behavior component corresponding to the virtual live streaming character to perform the behavior operation, and/or control, according to the behavior control instruction, the virtual live streaming character to perform the corresponding behavior operation.

In a third aspect, an embodiment of the disclosure provides an electronic device, including a memory and at least one processor. The memory is used to store one or more computer instructions. One or more computer instructions are executed by at least one processor to implement the method steps of the behavior control method for a virtual live streaming character.

In a fourth aspect, an embodiment of the disclosure provides a computer-readable storage medium used to store computer instructions used by the behavior control apparatus. The computer-readable storage medium includes computer instructions used to perform the behavior control method for a virtual live streaming character as the behavior control apparatus for a virtual live streaming character.

In a fifth aspect, an embodiment of the disclosure provides a computer program product, including a computer program/instruction. When executed by a processor, the computer program/instruction implements the method steps of the behavior control method for a virtual live streaming character.

The technical solution provided by the embodiments of the disclosure may include the following beneficial effects.

In the above technical solution, atmosphere data of a live streaming service is acquired based on viewer behavior data, and multi-modal feedback behavior decision-making is performed based on a combination of scenario data of the live streaming service and the atmosphere data of the live streaming service. This technical solution combines existing knowledge and newly added behavior, achieves targeted behavior decision and control, improves the accuracy of virtual human behavior control, and considers both flexibility and comprehensiveness, thereby greatly improving the quality of virtual human behavior, improving the viewing experience of a user, and facilitating the development of a virtual human-based platform.

The foregoing general description and the following detailed description are merely exemplary and explanatory and are not limitations to the disclosure.

BRIEF DESCRIPTION OF THE DRAWINGS

Other features, objectives, and advantages of the disclosure will become more apparent from the following detailed description of the non-limiting embodiments with reference to the accompanying drawings. In the accompanying drawings.

DETAILED DESCRIPTION

Exemplary embodiments of the disclosure are described below in detail with reference to the accompanying drawings so that those skilled in the art can easily implement the embodiments. In addition, for clarity, parts irrelevant to the description of the exemplary embodiments are omitted in the accompanying drawings.

In the disclosure, terms such as "include" or "have" are intended to indicate the existence of features, numbers, steps, actions, components, parts, or combinations thereof disclosed in the disclosure, and are not intended to exclude the possibility of existence or addition of one or more other features, numbers, steps, actions, components, parts, or combinations thereof.

In addition, it should be further noted that the embodiments of the disclosure and features in the embodiments can be combined with each other if there is no conflict. The disclosure is described below in detail with reference to the accompanying drawings and the embodiments.

In the technical solution provided by the embodiments of the disclosure, atmosphere data of a live streaming service is acquired based on viewer behavior data, and multi-modal feedback behavior decision is performed based on a combination of scenario data of the live streaming service and the atmosphere data of the live streaming service. This technical solution combines existing knowledge and newly added behavior, achieves targeted behavior decision and control, improves the accuracy of virtual human behavior control, and considers both flexibility and comprehensiveness, thereby greatly improving the quality of virtual human behavior, improving the viewing experience of a user, and facilitating the development of a virtual human-based platform.

Figure 1:
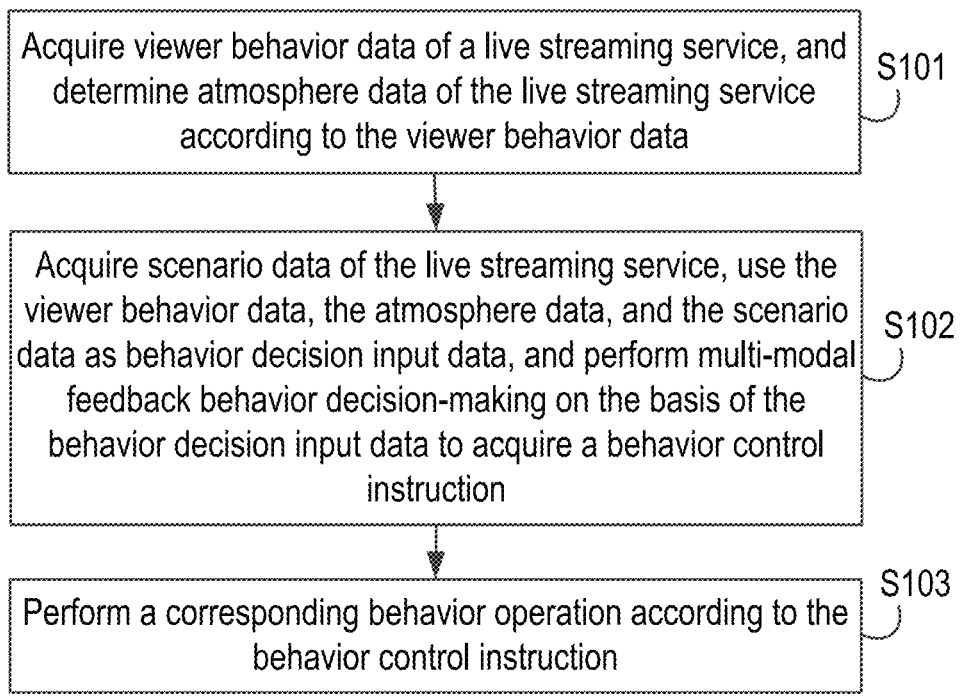
FIG. 1 is a flow diagram illustrating a behavior control method for a virtual live streaming character according to an embodiment of the disclosure.

FIG. 1 shows a flowchart of the behavior control method for a virtual live streaming character according to an embodiment of the disclosure. As shown in FIG. 1, the behavior control method for a virtual live streaming character includes the following steps S101-S103.

In step S101, viewer behavior data of a live streaming service is acquired, and atmosphere data of the live streaming service is determined according to the viewer behavior data.

In step S102, scenario data of the live streaming service is acquired, the viewer behavior data, the atmosphere data, and the scenario data are used as behavior decision input data, and multi-modal feedback behavior decision is performed based on the behavior decision input data to acquire a behavior control instruction.

In step S103, a corresponding behavior operation is performed according to the behavior control instruction.

As mentioned above, with the development of Internet technology, virtual human-based platforms such as live streaming and intelligent customer service emerge over time. The use of a virtual human can facilitate management and reduce labor costs. Therefore, the virtual human is more and more widely used. In current systems, generally, virtual human behavior decision is performed based on knowledge or a behavior tree, or the virtual human behavior decision is acquired completely by means of online learning. However, the two methods have some defects: in the virtual human behavior decision method employing knowledge or a behavior tree, a decision is performed only based on predetermined knowledge or a behavior tree, a decision direction cannot be automatically adjusted, and targeted decision cannot be performed based on each virtual human and each application scenario; the virtual human behavior decision method employing online learning cannot consider both existing knowledge and newly added behavior. The above virtual human behavior decision methods have low accuracy and lack flexibility and comprehensiveness, thereby greatly reducing the quality of virtual human behavior, reducing the viewing experience of a user, and hindering the development of the virtual human-based platform.

In view of the defects, in this embodiment, a behavior control method for a virtual live streaming character is provided. In this method, atmosphere data of a live streaming service is acquired based on viewer behavior data, and multi-modal feedback behavior decision is performed based on a combination of scenario data of the live streaming service and the atmosphere data of the live streaming service. This technical solution combines existing knowledge and newly added behavior, achieves targeted behavior decision and control, improves the accuracy of virtual human behavior control, and considers both flexibility and comprehensiveness, thereby greatly improving the quality of virtual human behavior, improving the viewing experience of a user, and facilitating the development of a virtual human-based platform.

In an embodiment of the disclosure, the behavior control method for a virtual live streaming character may be applied to a behavior controller such as a computer, a computing device, an electronic device, a server, a service cluster, or the like for controlling the behavior of the virtual live streaming character.

In an embodiment of the disclosure, the viewers refers to subjects viewing the live streaming service provided by the virtual live streaming character. For example, if the virtual live streaming character is a host of a shopping platform, then the viewer may be a purchaser entering a live streaming room, and if the virtual live streaming character is a teacher of an education platform, then the viewer may be a learner entering a live streaming room, and the like.

In an embodiment of the disclosure, the viewer behavior data refers to behavior data related to the viewer, such as a time when the viewer enters the live streaming room, text, a voice, an image, or a video sent by the viewer, interaction operations of the viewer such as clicking, like giving, and flower presenting, and other behavior data.

In an embodiment of the disclosure, the atmosphere data refers to data acquired based on the viewer behavior data and used to represent atmosphere information in a certain scenario and represent an intention and/or emotion that needs the most attention or response from a virtual live streaming character in a current live streaming room having multiple viewers. The atmosphere data may consist of intention and/or emotion data.

In an embodiment of the disclosure, scenario data refers to data used to describe specific scenario information of a certain live streaming room. The scenario data may be, for example, viewer counts, "like" counts, comment counts, commenting frequency, viewer intimacy, and the like in the live streaming room.

In an embodiment of the disclosure, the multi-modal feedback behavior decision refers to a behavior decision method in which a decision is performed according to multiple dimensions such as viewers, an atmosphere, a scenario, existing knowledge, newly added behavior, and the like and a feedback mechanism is used.

In the above embodiments, viewer behavior data of a live streaming service is firstly acquired, and atmosphere data of the live streaming service is determined according to the viewer behavior data. Then, scenario data of the live streaming service is acquired, and the viewer behavior data, the atmosphere data, and the scenario data are used as behavior decision input data to perform comprehensive, multi-modal, and feedback behavior decisions to combine the viewer behavior data and the scenario data to acquire a behavior control instruction for a virtual live streaming character of a certain scenario. Finally, a corresponding behavior operation is performed based on the behavior control instruction.

In an embodiment of the disclosure, in step S101, the step of determining atmosphere data of the live streaming service according to the viewer behavior data may include the following steps: acquiring real-time behaviors of viewers; collecting real-time behavior data of the viewers when the real-time behaviors of the viewers meets a pre-configured triggering condition; processing the real-time behavior data of the viewers to acquire intention evaluation data and emotion evaluation data; and calculating the frequency of occurrence of the intention evaluation data and the emotion evaluation data, and using one or more pieces of intention evaluation data and emotion evaluation data having the highest frequency of occurrence as the atmosphere data of the live streaming service.

In this embodiment, a current atmosphere is determined by means of intention recognition and emotion recognition. Specifically, real-time behaviors such as entering or leaving a live streaming room, commenting, "like" giving, and the like of a viewer is first acquired. When the real-time behaviors of the viewers meet a pre-configured triggering condition, real-time behavior data of the viewers is collected. For example, after certain viewers enters a live streaming room, if it is found that the number of viewer counts in the live streaming room reaches a certain number threshold, it is considered that the behavior of the viewers entering the live streaming room meets a triggering condition of the live streaming room regarding the viewer counts, and collection of behavior data related to the behavior of the viewers entering the live streaming room may be triggered, the behavior data being, for example, a time when the viewers enter the live streaming room, information about the viewers, a time when other viewers in the current live streaming room enter the live streaming room, information about other viewers in the current live streaming room, and the like. Then, the real-time behavior data of the viewers is processed. For example, intention recognition and emotion recognition may be performed by means of semantic analysis, text analysis, voice analysis, image analysis, and the like to acquire intention evaluation data and emotion evaluation data. The intention recognition and the emotion recognition may use conventional intention recognition and emotion recognition methods in current systems. The disclosure does not specifically limit a specific implementation of the intention recognition and the emotion recognition. For example, quantitative intention recognition and emotion recognition may be performed based on the real-time behavior data of the viewers to acquire a numerical intention recognition result and emotion recognition result, namely numerical intention evaluation data and emotion evaluation data. The numerical emotion evaluation data may be a continuously changing value changing over time or can be a discrete value, and the numerical intention evaluation data is a discrete value. Then the frequency of occurrence of the intention evaluation data and the emotion evaluation data is calculated, and one or more pieces of intention evaluation data and emotion evaluation data having the highest frequency of occurrence may be considered to be dominant intentions and emotions in the current live streaming room. Therefore, the atmosphere data of the current live streaming room can be inferred based on the dominant intentions and emotions. For example, the one or more pieces of intention evaluation data and emotion evaluation data having the highest frequency of occurrence may be used as the atmosphere data of the live streaming service. In this embodiment, an atmosphere of a certain live streaming room is determined based on viewer behavior data of the live streaming room rather than based on merely a single viewer. Therefore, a more comprehensive data basis can be provided for subsequent behavior decisions, thereby effectively improving the accuracy of behavior decisions in a multi-user live streaming room.

In an embodiment of the disclosure, in step S102, the step of performing multi-modal feedback behavior decision based on the behavior decision input data to acquire a behavior control instruction may include the following steps: determining whether the behavior decision input data is pre-configured behavior decision input data in a pre-configured behavior decision input data set, where the pre-configured behavior decision input data set includes the pre-configured behavior decision input data and a pre-configured behavior control instruction corresponding to the pre-configured behavior decision input data; in response to the behavior decision input data is the pre-configured behavior decision input data in the pre-configured behavior decision input data set, acquiring the pre-configured behavior control instruction corresponding to the pre-configured behavior decision input data, and using the same as the behavior control instruction; and in response to the behavior decision input data is not the pre-configured behavior decision input data in the pre-configured behavior decision input data set, inputting the behavior decision input data into a pre-trained behavior decision model to acquire behavior decision result data, and generating the behavior control instruction based on the behavior decision result data.

In this embodiment, virtual live streaming character behavior decision is performed in comprehensive consideration of existing knowledge and current input data, and this is specifically as follows: firstly, behavior decision employing highly decisional existing knowledge is performed to ensure the consistency of virtual live streaming characters on some common problems. The highly decisional existing knowledge refers to existing knowledge having a great influence on a behavior decision result. For example, the highly decisional existing knowledge may be a pre-configured correspondence between behavior decision input data and a behavior control instruction and having a great influence. The great influence refers to that if there is behavior decision input data restricted by certain highly decisional existing knowledge, a behavior control instruction determined according to the behavior decision input data is a behavior control instruction restricted by the highly decisional existing knowledge and corresponding to the behavior decision input data. More specifically, firstly, a pre-configured behavior decision input data set may be provided according to a restriction of the highly decisional existing knowledge. The pre-configured behavior decision input data set includes pre-configured behavior decision input data and a pre-configured behavior control instruction having a high correlation with the pre-configured behavior decision input data. For example, there is a necessary correlation between the pre-configured behavior decision input data in the pre-configured behavior decision input data set and the corresponding pre-configured behavior control instruction or the frequency of association occurrence is higher than a pre-configured frequency threshold. Then, it is determined, by means of data comparison, whether the behavior decision input data is the pre-configured behavior decision input data in the pre-configured behavior decision input data set. If so, then the pre-configured behavior control instruction in the pre-configured behavior decision input data set and corresponding to the pre-configured behavior decision input data is acquired and is used as a behavior control instruction finally needed.

It should be considered that the above behavior decision employing highly decisional existing knowledge may only guarantee some part of behavior decision capabilities and that the other cases are not restricted by or do not need to be restricted by any highly decisional existing knowledge. And it should further be considered that if decision logic of the highly decisional existing knowledge is complex, the costs of subsequent operation and maintenance may be increased and it is not beneficial to system optimization and iteration. Therefore, the behavior decision employing highly decisional existing knowledge needs to be combined with behavior decision employing current input data-based learning so as to have both the existing knowledge and the current input data taken into consideration. That is, if the behavior decision input data is not the pre-configured behavior decision input data in the pre-configured behavior decision input data set, it is indicated that the behavior decision input data is not restricted by or does not need to be restricted by highly decisional existing knowledge. Therefore, in this case, behavior decision learning based on current input data may be performed. That is, the behavior decision input data is inputted into a pre-trained behavior decision model to acquire behavior decision result data, and eventually the behavior control instruction may be generated based on the behavior decision result data.

In this embodiment, the behavior control instruction acquired based on the behavior decision employing highly decisional existing knowledge and the behavior control instruction acquired based on current input data-based learning can complement each other to effectively guarantee the differentiation and personalization of the virtual live streaming character.

In an embodiment of the disclosure, the step of inputting the behavior decision input data into a pre-trained behavior decision model to acquire behavior decision data and generating the behavior control instruction based on the behavior decision data may include the following steps: inputting the behavior decision input data into the pre-trained behavior decision model to acquire multiple behavior decision results and probabilities corresponding thereto, and generating the behavior control instruction based on a behavior decision result having the highest probability.

The behavior decision model may be a behavior decision model based on a posteriori probability. In this embodiment, after a pre-trained behavior decision model is acquired, the behavior decision model may be used directly to acquire the behavior control instruction. Specifically, the behavior decision input data may be inputted into the pre-trained behavior decision model to acquire multiple behavior decision results and probabilities corresponding thereto, and then the behavior control instruction may be generated based on a behavior decision result having the highest probability.

In an embodiment of the disclosure, the method may further include the following step: training the behavior decision model.

In an embodiment of the disclosure, the step of training the behavior decision model may include the following steps: determining an initial behavior decision model; acquiring a historical behavior decision data set, where the historical behavior decision data set includes historical behavior decision input data and historical behavior decision result data corresponding to the historical behavior decision input data; and training the initial behavior decision model by using the historical behavior decision input data as an input and using the historical behavior decision result data corresponding thereto as an output to acquire the behavior decision model.

In this embodiment, during training of the behavior decision model, firstly, an initial behavior decision model is determined, where the initial behavior decision model may be selected according to the requirements of a practical application. Then, historical behavior decision input data and historical behavior decision result data corresponding to the historical behavior decision input data are acquired. Then, the initial behavior decision model is trained by using the historical behavior decision input data as an input and using historical behavior decision result data corresponding to the historical behavior decision input data as an output. When a training result converges, the behavior decision model can be acquired. Learning and training of the above behavior decision may be implemented by learning and training methods such as q-learning, DQN, Policy Gradient, DDPG, and the like. The disclosure does not specifically limit the specific learning and training implementation method for the behavior decision.

In an embodiment of the disclosure, the method may further include the following steps: using the behavior decision input data and the behavior decision result data corresponding thereto as new training data and adding the new training data to a historical behavior decision data set of the behavior decision model.

To improve the completeness of the historical behavior decision data set serving as training data of the behavior decision model and to ensure the comprehensiveness of a learning and training result of the behavior decision, in this embodiment, a feedback mechanism is used to perform behavior decision. That is, after the behavior decision model is used to acquire a behavior decision result based on behavior decision input data currently acquired, the behavior decision input data and corresponding behavior decision result data acquired are further used as new training data and are added to a training data set of the behavior decision model, namely to the historical behavior decision data set, and then the behavior decision model is trained to enrich the training data, improve the accuracy of the behavior decision, and acquire a more complete behavior decision model and use the same to output a next behavior decision result.

In an embodiment of the disclosure, the method may further include the following step: correcting the behavior control instruction generated based on the behavior decision result data to acquire a correction behavior control instruction.

Considering that the behavior decision result acquired by means of the behavior decision model is sometimes not necessarily an appropriate solution, in this embodiment, the behavior control instruction acquired by means of the behavior decision model may also be corrected. In practical applications, after sufficient learning and training, the reliability of the behavior decision result acquired based on the behavior decision model is greatly increased. That is, the need or reliance from the behavior decision result on the correction of the behavior control instruction is greatly reduced, or the behavior decision result may not even need the correction of the behavior control instruction.

In an embodiment of the disclosure, the step of correcting the behavior control instruction generated based on the behavior decision result data may further include the following steps: acquiring a correction behavior decision input data set, where the correction behavior decision input data set includes correction behavior decision input data and a correction behavior control instruction corresponding to the correction behavior decision input data; determining whether the behavior decision input data is the correction behavior decision input data in the correction behavior decision input data set; and if the behavior decision input data is the correction behavior decision input data in the correction behavior decision input data set, acquiring the correction behavior control instruction corresponding to the correction behavior decision input data, and using the same as a behavior control instruction acquired after correcting the behavior control instruction.

In this embodiment, the behavior control instruction is also corrected based on existing knowledge. However, the existing knowledge is not the highly decisional existing knowledge described above but is auxiliary existing knowledge provided for the correction of the behavior control instruction. The auxiliary existing knowledge refers to existing knowledge for auxiliary adjustment for the behavior decision result. Specifically, firstly, a correction behavior decision input data set is acquired, where the correction behavior decision input data set includes correction behavior decision input data, a correction condition, and a correction behavior control instruction corresponding to the correction behavior decision input data. Then, it is determined whether the behavior decision input data is the correction behavior decision input data in the correction behavior decision input data set, and it is determined whether the correction condition is met. If the behavior decision input data is the correction behavior decision input data in the correction behavior decision input data set, and also if the correction condition is met, the correction behavior control instruction corresponding to the correction behavior decision input data is used as a behavior control instruction acquired after correcting the behavior control instruction. For example, if it is determined in advance that an intention of a viewer in a certain live streaming room is "want to see product A," a behavior control instruction acquired according to the above learning and training mechanism is "display product A." However, in fact, if product A is displayed just before the intention "want to see product A" of the viewer is acquired by means of recognition, product A should not be displayed again. In this case, it is necessary to correct the behavior control instruction by means of the correction condition corresponding to the auxiliary existing knowledge. For example, if the auxiliary existing knowledge is expressed as "do not perform the same action repeatedly," it may be determined that a behavior control instruction "display product A" acquired according to input data "want to see product A" falls within a correction range restricted by the correction condition corresponding to the auxiliary existing knowledge, and the behavior control instruction "display product A" needs to be corrected. For example, the behavior control instruction may be corrected to a behavior decision result having a high probability value acquired according to the above learning and training mechanism.

Similar to the above, in order to improve the completeness of the historical behavior decision data set serving as training data of the behavior decision model and to ensure the comprehensiveness of a learning and training result of the behavior decision, in an embodiment of the disclosure, the corrected data may also be used as new training data in the training of the behavior decision model. That is, in this embodiment, the method may further include the following steps: using the behavior decision input data and behavior decision result data corresponding to the corrected behavior control instruction as new training data and adding the new training data to the historical behavior decision data set of the behavior decision model.

In an embodiment of the disclosure, step S103, namely the step of performing a corresponding behavior operation according to the behavior control instruction, may include the following steps: calling, according to the behavior control instruction, a behavior component corresponding to the virtual live streaming character to perform the behavior operation, and/or controlling, according to the behavior control instruction, the virtual live streaming character to perform the corresponding behavior operation.

After a behavior control instruction is generated, a corresponding behavior operation may be performed according to the behavior control instruction. Specifically, if the behavior controller is a component corresponding to the virtual live streaming character, then after the behavior control instruction is acquired, a corresponding behavior component may be called according to the behavior control instruction to perform the behavior operation. If the behavior controller is a component in the virtual live streaming character, after the behavior control instruction is acquired, a corresponding behavior component may be called according to the behavior control instruction or a performing object may be controlled to perform the behavior operation.

The behavior operation may include one or more of the following operations: driving an action, an expression, a pronunciation, and other contents of the virtual live streaming character; chatting with the viewer; replying to a question from the viewer; greeting the viewer; performing dancing; bidding farewell to the viewer; driving switching between product broadcasting and displaying, script displaying, overlay comment displaying, comment board displaying, and the like; driving a background image and a background sound of the live streaming room to be changed, and the like.

Figure 2:
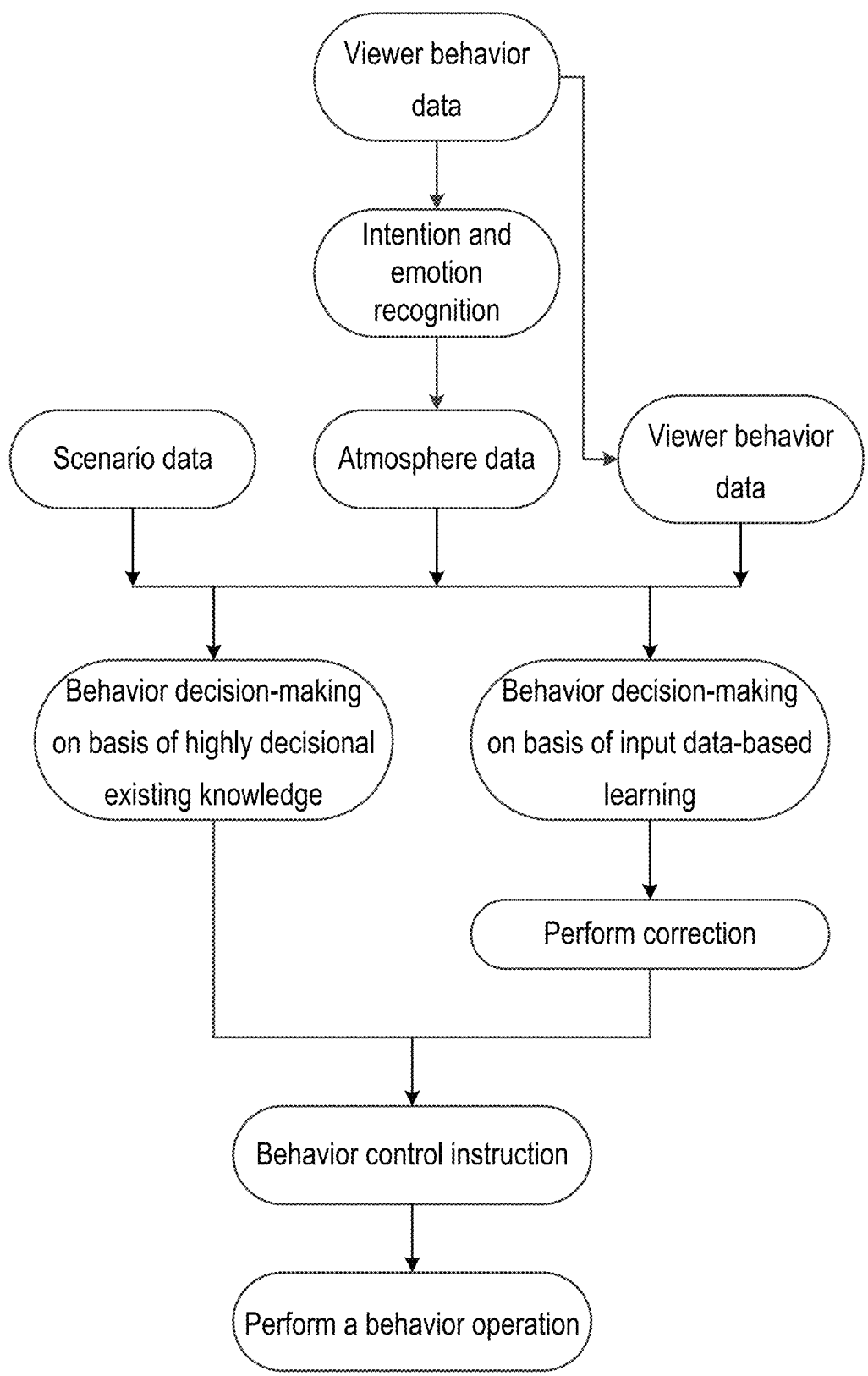
FIG. 2 is a flow diagram illustrating a behavior control method for a virtual live streaming character according to an embodiment of the disclosure.

FIG. 2 is a flow diagram illustrating a behavior control method according to an embodiment of the disclosure. As shown in FIG. 2, viewer behavior data is firstly acquired, intention and emotion recognition are performed on the viewer behavior data to acquire intention evaluation data and emotion evaluation data, and the frequency of occurrence of the intention evaluation data and the emotion evaluation data is calculated to acquire atmosphere data. Scenario data is acquired, the viewer behavior data, the atmosphere data, and the scenario data are used as behavior decision input data, behavior decision employing highly decisional existing knowledge and behavior decision employing input data-based learning are performed based on the behavior decision input data, and a result of the behavior decision employing input data-based learning is corrected to finally acquire a multi-modal feedback behavior decision result and a corresponding behavior control instruction. Finally, a corresponding behavior operation can be performed according to the behavior control instruction.

The above behavior control method for a virtual live streaming character may be applied to various application scenarios, such as a sales scenario, an education scenario, a performance scenario, a displaying scenario, a traveling scenario, a social contact scenario, and the like.

Apparatus embodiments of the disclosure are described below and can be used to perform the method embodiments of the disclosure.

Figure 3:
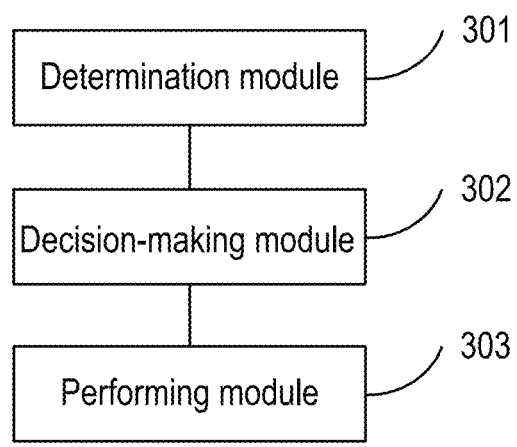
FIG. 3 is a block diagram illustrating a behavior control apparatus for a virtual live streaming character according to an embodiment of the disclosure.

FIG. 3 is a block diagram illustrating a behavior control apparatus according to an embodiment of the disclosure. The apparatus may be implemented as a part of or the entirety of an electronic device by means of software, hardware, or a combination of the two. As shown in FIG. 3, the behavior control apparatus includes a determination module 301, configured to acquire viewer behavior data of a live streaming service and determine atmosphere data of the live streaming service according to the viewer behavior data; a decision-making module 302, configured to acquire scenario data of the live streaming service, use the viewer behavior data, the atmosphere data, and the scenario data as behavior decision input data, and perform multi-modal feedback behavior decision based on the behavior decision input data to acquire a behavior control instruction; and a performing module 303, configured to perform a corresponding behavior operation according to the behavior control instruction.

As mentioned above, with the development of Internet technology, virtual human-based platforms such as live streaming and intelligent customer service emerge over time. The use of a virtual human can facilitate management and reduce labor costs. Therefore, the virtual human is more and more widely used. In current systems, generally, virtual human behavior decision is performed based on knowledge or a behavior tree, or the virtual human behavior decision is acquired completely by means of online learning. However, the two methods have some defects: in the virtual human behavior decision method employing knowledge or a behavior tree, a decision is performed only based on predetermined knowledge or a behavior tree, a decision direction cannot be automatically adjusted, and a targeted decision cannot be performed based on each virtual human and each application scenario; the virtual human behavior decision method employing online learning cannot consider both existing knowledge and newly added behavior. The above virtual human behavior decision methods have low accuracy and lack flexibility and comprehensiveness, thereby greatly reducing the quality of virtual human behavior, reducing viewing experience of a user, and hindering the development of the virtual human-based platform.

In view of the aforementioned defects, in this embodiment, a behavior control apparatus for a virtual live streaming character is provided. In this apparatus, atmosphere data of a live streaming service is acquired based on viewer behavior data, and multi-modal feedback behavior decision is performed based on a combination of scenario data of the live streaming service and the atmosphere data of the live streaming service. This technical solution combines existing knowledge and newly added behavior, achieves targeted behavior decision and control, improves the accuracy of virtual human behavior control, and considers both flexibility and comprehensiveness, thereby greatly improving the quality of virtual human behavior, improving viewing experience of users, and facilitating the development of a virtual human-based platform.

In an embodiment of the disclosure, the behavior control apparatus for a virtual live streaming character may be implemented as a behavior controller such as a computer, a computing device, an electronic device, a server, a service cluster, or the like for controlling the behavior of the virtual live streaming character.

In an embodiment of the disclosure, the viewer refers to subjects viewing the live streaming service provided by the virtual live streaming character. For example, if the virtual live streaming character is a host of a shopping platform, the viewers may be purchasers entering a live streaming room, and if the virtual live streaming character is a teacher of an education platform, the viewers may be learners entering a live streaming room, and the like.

In an embodiment of the disclosure, the viewer behavior data refers to behavior data related to the viewers, such as a time when the viewers enter the live streaming room, text, a voice, an image, or a video sent by the viewers, interaction operations of the viewers such as clicking, like giving, and flower presenting, and other behavior data.

In an embodiment of the disclosure, the atmosphere data refers to data acquired based on the viewer behavior data and used to represent atmosphere information in a certain scenario and represent an intention and/or emotion that needs the most attention or response from a virtual live streaming character in a current live streaming room having multiple viewers. The atmosphere data may consist of intention and/or emotion data.

In an embodiment of the disclosure, scenario data refers to data used to describe specific scenario information of a certain live streaming room. The scenario data may be, for example, viewer counts, "like" counts, comment counts, commenting frequency, viewer intimacy, and the like in the live streaming room.

In an embodiment of the disclosure, the multi-modal feedback behavior decision refers to a behavior decision method in which a decision is performed according to multiple dimensions such as viewers, an atmosphere, a scenario, existing knowledge, newly added behavior, and the like and a feedback mechanism is used.

In the above embodiments, viewer behavior data of a live streaming service is firstly acquired, and atmosphere data of the live streaming service is determined according to the viewer behavior data. Then, scenario data of the live streaming service is acquired, and the viewer behavior data, the atmosphere data, and the scenario data are used as behavior decision input data to perform comprehensive, multi-modal, and feedback behavior decisions to combine the viewer behavior data and the scenario data to acquire a behavior control instruction for a virtual live streaming character of a certain scenario. Finally, a corresponding behavior operation is performed based on the behavior control instruction.

In an embodiment of the disclosure, a portion in the determination module 301 for determining atmosphere data of the live streaming service according to the viewer behavior data may be configured to acquire real-time behaviors of viewers; collect real-time behavior data of the viewers when the real-time behaviors of the viewers meet a pre-configured triggering condition; process the real-time behavior data of the viewers to acquire intention evaluation data and emotion evaluation data; and calculate the frequency of occurrence of the intention evaluation data and the emotion evaluation data, and use one or more pieces of intention evaluation data and emotion evaluation data having the highest frequency of occurrence as the atmosphere data of the live streaming service.

In this embodiment, a current atmosphere is determined by means of intention recognition and emotion recognition. Specifically, real-time behaviors such as entering or leaving a live streaming room, commenting, "like" giving, and the like of viewers are first acquired. When the real-time behaviors of the viewers meet a pre-configured triggering condition, real-time behavior data of the viewers is collected. For example, after certain viewers enter a live streaming room, if it is found that the number of viewer counts in the live streaming room reaches a certain number threshold, it is considered that the behavior of the viewers entering the live streaming room meets a triggering condition of the live streaming room regarding the viewer counts, and collection of behavior data related to the behavior of the viewers entering the live streaming room may be triggered, the behavior data being, for example, a time when the viewers enter the live streaming room, information about the viewers, a time when other viewers in the current live streaming room enters the live streaming room, information about other viewers in the current live streaming room, and the like. Then, the real-time behavior data of the viewers is processed. For example, intention recognition and emotion recognition may be performed by means of semantic analysis, text analysis, voice analysis, image analysis, and the like to acquire intention evaluation data and emotion evaluation data. The intention recognition and the emotion recognition may use conventional intention recognition and emotion recognition methods in current systems. The disclosure does not specifically limit a specific implementation of the intention recognition and the emotion recognition. For example, quantitative intention recognition and emotion recognition may be performed based on the real-time behavior data of the viewers to acquire a numerical intention recognition result and emotion recognition result, namely numerical intention evaluation data and emotion evaluation data. The numerical emotion evaluation data may be a continuously changing value changing over time or can be a discrete value, and the numerical intention evaluation data is a discrete value. Then the frequency of occurrence of the intention evaluation data and the emotion evaluation data is calculated, and one or more pieces of intention evaluation data and emotion evaluation data having the highest frequency of occurrence may be considered to be dominant intentions and emotions in the current live streaming room. Therefore, the atmosphere data of the current live streaming room can be inferred based on the dominant intentions and emotions. For example, the one or more pieces of intention evaluation data and emotion evaluation data having the highest frequency of occurrence may be used as the atmosphere data of the live streaming service. In this embodiment, an atmosphere of a certain live streaming room is determined based on viewer behavior data of the live streaming room rather than based on merely a single viewer. Therefore, a more comprehensive data basis can be provided for subsequent behavior decisions, thereby effectively improving the accuracy of behavior decisions in a multi-user live streaming room.

In an embodiment of the disclosure, a portion in the decision-making module 302 for performing multi-modal feedback behavior decisions based on the behavior decision input data to acquire a behavior control instruction may be configured to: determine whether the behavior decision input data is pre-configured behavior decision input data in a pre-configured behavior decision input data set, where the pre-configured behavior decision input data set includes the pre-configured behavior decision input data and a pre-configured behavior control instruction corresponding to the pre-configured behavior decision input data; if the behavior decision input data is the pre-configured behavior decision input data in the pre-configured behavior decision input data set, acquire the pre-configured behavior control instruction corresponding to the pre-configured behavior decision input data, and use the same as the behavior control instruction; and if the behavior decision input data is not the pre-configured behavior decision input data in the pre-configured behavior decision input data set, input the behavior decision input data into a pre-trained behavior decision model to acquire behavior decision result data, and generate the behavior control instruction based on the behavior decision result data.

In this embodiment, virtual live streaming character behavior decision is performed in comprehensive consideration of existing knowledge and current input data, and this is specifically as follows: firstly, behavior decision employing highly decisional existing knowledge is performed to ensure the consistency of virtual live streaming characters on some common problems. The highly decisional existing knowledge refers to existing knowledge having a great influence on a behavior decision result. For example, the highly decisional existing knowledge may be a pre-configured correspondence between behavior decision input data and a behavior control instruction and have a great influence. The great influence refers to that if there is behavior decision input data restricted by certain highly decisional existing knowledge, a behavior control instruction determined according to the behavior decision input data is a behavior control instruction restricted by the highly decisional existing knowledge and corresponding to the behavior decision input data. More specifically, firstly, a pre-configured behavior decision input data set may be provided according to a restriction of the highly decisional existing knowledge. The pre-configured behavior decision input data set includes pre-configured behavior decision input data and a pre-configured behavior control instruction having a high correlation with the pre-configured behavior decision input data. For example, there is a necessary correlation between the pre-configured behavior decision input data in the pre-configured behavior decision input data set and the corresponding pre-configured behavior control instruction, or the frequency of association occurrence is higher than a pre-configured frequency threshold. Then, it is determined, by means of data comparison, whether the behavior decision input data is the pre-configured behavior decision input data in the pre-configured behavior decision input data set. If so, the pre-configured behavior control instruction in the pre-configured behavior decision input data set and corresponding to the pre-configured behavior decision input data is acquired and is used as a behavior control instruction finally needed.

It should be considered that the above behavior decision employing highly decisional existing knowledge may only guarantee some part of behavior decision capabilities and that the other cases are not restricted by or do not need to be restricted by any highly decisional existing knowledge. And it should further be considered that if decision logic of the highly decisional existing knowledge is complex, the costs of subsequent operation and maintenance may be increased and it is not beneficial to system optimization and iteration. Therefore, the behavior decision employing highly decisional existing knowledge needs to be combined with behavior decision employing current input data-based learning so as to have both the existing knowledge and the current input data taken into consideration. That is, if the behavior decision input data is not the pre-configured behavior decision input data in the pre-configured behavior decision input data set, it is indicated that the behavior decision input data is not restricted by or does not need to be restricted by highly decisional existing knowledge. Therefore, in this case, behavior decision learning based on current input data may be performed. That is, the behavior decision input data is inputted into a pre-trained behavior decision model to acquire behavior decision result data, and eventually the behavior control instruction may be generated based on the behavior decision result data.

In this embodiment, the behavior control instruction acquired based on the behavior decision employing highly decisional existing knowledge and the behavior control instruction acquired based on current input data-based learning can complement each other to effectively guarantee the differentiation and personalization of the virtual live streaming character.

In an embodiment of the disclosure, a portion for inputting the behavior decision input data into a pre-trained behavior decision model to acquire behavior decision data and generating the behavior control instruction based on the behavior decision data may be configured to input the behavior decision input data into the pre-trained behavior decision model to acquire multiple behavior decision results and probabilities corresponding thereto; and generate the behavior control instruction based on a behavior decision result having the highest probability.

The behavior decision model may be a behavior decision model based on a posteriori probability. In this embodiment, after a pre-trained behavior decision model is acquired, the behavior decision model may be used directly to acquire the behavior control instruction. Specifically, the behavior decision input data may be inputted into the pre-trained behavior decision model to acquire multiple behavior decision results and probabilities corresponding thereto, and then the behavior control instruction may be generated based on a behavior decision result having the highest probability.

In an embodiment of the disclosure, the apparatus may further include: a training module configured to train the behavior decision model. In an embodiment of the disclosure, the training module may be configured to determine an initial behavior decision model; acquire a historical behavior decision data set, where the historical behavior decision data set includes historical behavior decision input data and historical behavior decision result data corresponding to the historical behavior decision input data; and train the initial behavior decision model by using the historical behavior decision input data as an input and using the historical behavior decision result data corresponding thereto as an output to acquire the behavior decision model.

In this embodiment, during training of the behavior decision model, firstly, an initial behavior decision model is determined, where the initial behavior decision model may be selected according to the requirements of a practical application. Then, historical behavior decision input data and historical behavior decision result data corresponding to the historical behavior decision input data are acquired. Then, the initial behavior decision model is trained by using the historical behavior decision input data as an input and using historical behavior decision result data corresponding to the historical behavior decision input data as an output. When a training result converges, the behavior decision model can be acquired. Learning and training of the above behavior decision may be implemented by learning and training methods such as q-learning, DQN, Policy Gradient, DDPG, and the like. The disclosure does not specifically limit the specific learning and training implementation method for the behavior decision.

In an embodiment of the disclosure, the training module may be further configured to use the behavior decision input data and the behavior decision result data corresponding thereto as new training data and add the new training data to a historical behavior decision data set of the behavior decision model.

To improve the completeness of the historical behavior decision data set serving as training data of the behavior decision model and to ensure the comprehensiveness of a learning and training result of the behavior decision, in this embodiment, a feedback mechanism is used to perform behavior decision. That is, after the behavior decision model is used to acquire a behavior decision result based on behavior decision input data currently acquired, the behavior decision input data and corresponding behavior decision result data acquired are further used as new training data and are added to a training data set of the behavior decision model, namely to the historical behavior decision data set, and then the behavior decision model is trained to enrich the training data, improve the accuracy of the behavior decision, and acquire a more complete behavior decision model and use the same to output a next behavior decision result.

In an embodiment of the disclosure, the apparatus may further include: a correction module, configured to correct the behavior control instruction generated based on the behavior decision result data to acquire a corrected behavior control instruction.

Considering that the behavior decision result acquired by means of the behavior decision model is sometimes not necessarily an appropriate solution, in this embodiment, the behavior control instruction acquired by means of the behavior decision model may also be corrected. In practical applications, after sufficient learning and training, the reliability of the behavior decision result acquired based on the behavior decision model is greatly increased. That is, the need or reliance from the behavior decision result on the correction of the behavior control instruction is greatly reduced, or the behavior decision result may not even need the correction of the behavior control instruction.

In an embodiment of the disclosure, the correction module may be configured to acquire a correction behavior decision input data set, where the correction behavior decision input data set includes correction behavior decision input data and a correction behavior control instruction corresponding to the correction behavior decision input data; determine whether the behavior decision input data is the correction behavior decision input data in the correction behavior decision input data set; and if the behavior decision input data is the correction behavior decision input data in the correction behavior decision input data set, acquire the correction behavior control instruction corresponding to the correction behavior decision input data, and use the same as a behavior control instruction acquired after correcting the behavior control instruction.

In this embodiment, the behavior control instruction is also corrected based on existing knowledge. However, the existing knowledge is not the highly decisional existing knowledge described above, but is auxiliary existing knowledge provided for the correction of the behavior control instruction. The auxiliary existing knowledge refers to existing knowledge for auxiliary adjustment for the behavior decision result. Specifically, firstly, a correction behavior decision input data set is acquired, where the correction behavior decision input data set includes correction behavior decision input data, a correction condition, and a correction behavior control instruction corresponding to the correction behavior decision input data. Then, it is determined whether the behavior decision input data is the correction behavior decision input data in the correction behavior decision input data set, and it is determined whether the correction condition is met. If the behavior decision input data is the correction behavior decision input data in the correction behavior decision input data set, and if the correction condition is met, the correction behavior control instruction corresponding to the correction behavior decision input data is used as a behavior control instruction acquired after correcting the behavior control instruction. For example, if it is determined in advance that an intention of a viewer in a certain live streaming room is "want to see product A," a behavior control instruction acquired according to the above learning and training mechanism is "display product A." However, in fact, if product A is displayed just before the intention "want to see product A" of the viewer is acquired by means of recognition, product A should not be displayed again. In this case, it is necessary to correct the behavior control instruction by means of the correction condition corresponding to the auxiliary existing knowledge. For example, if the auxiliary existing knowledge is expressed as "do not perform the same action repeatedly," it may be determined that a behavior control instruction "display product A" acquired according to input data "want to see product A" falls within a correction range restricted by the correction condition corresponding to the auxiliary existing knowledge, and the behavior control instruction "display product A" needs to be corrected. For example, the behavior control instruction may be corrected to a behavior decision result having a high probability value acquired according to the above learning and training mechanism.

Similar to the above, in order to improve the completeness of the historical behavior decision data set serving as training data of the behavior decision model and to ensure the comprehensiveness of a learning and training result of the behavior decision, in an embodiment of the disclosure, the corrected data may also be used as new training data in the training of the behavior decision model. That is, in this embodiment, the training module may further be configured to use the behavior decision input data and behavior decision result data corresponding to the corrected behavior control instruction as new training data and add the new training data to the historical behavior decision data set of the behavior decision model.

In an embodiment of the disclosure, the performing module 303 may be configured to call, according to the behavior control instruction, a behavior component corresponding to the virtual live streaming character to perform the behavior operation, and/or control, according to the behavior control instruction, the virtual live streaming character to perform the corresponding behavior operation.

After a behavior control instruction is generated, a corresponding behavior operation may be performed according to the behavior control instruction. Specifically, if the behavior controller is a component corresponding to the virtual live streaming character, then after the behavior control instruction is acquired, a corresponding behavior component may be called according to the behavior control instruction to perform the behavior operation. If the behavior controller is a component in the virtual live streaming character, after the behavior control instruction is acquired, a corresponding behavior component may be called according to the behavior control instruction, or a performing object may be controlled to perform the behavior operation.

The behavior operation may include one or more of the following operations: driving an action, an expression, a pronunciation, and other contents of the virtual live streaming character; chatting with the viewers; replying to a question from the viewers; greeting the viewers; performing dancing; bidding farewell to the viewers; driving switching between product broadcasting and displaying, script displaying, overlay comment displaying, comment board displaying, and the like; driving a background image and a background sound of the live streaming room to be changed, and the like.

The above behavior control apparatus for a virtual live streaming character may be applied to various application scenarios, such as a sales scenario, an education scenario, a performance scenario, a displaying scenario, a traveling scenario, a social contact scenario, and the like.

Figure 4:
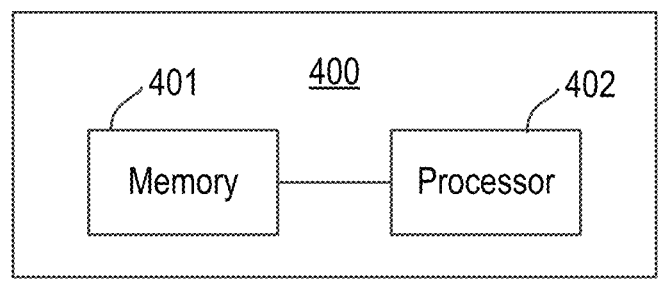
FIG. 4 is a block diagram illustrating a an electronic device according to an embodiment of the disclosure.

The disclosure further discloses an electronic device. FIG. 4 is a block diagram illustrating an electronic device according to an embodiment of the disclosure. As shown in FIG. 4, the electronic device 400 includes a memory 401 and a processor 402. The memory 401 is used to store one or more computer instructions. One or more computer instructions are executed by processor 402 to implement the aforementioned method steps.

Figure 5:
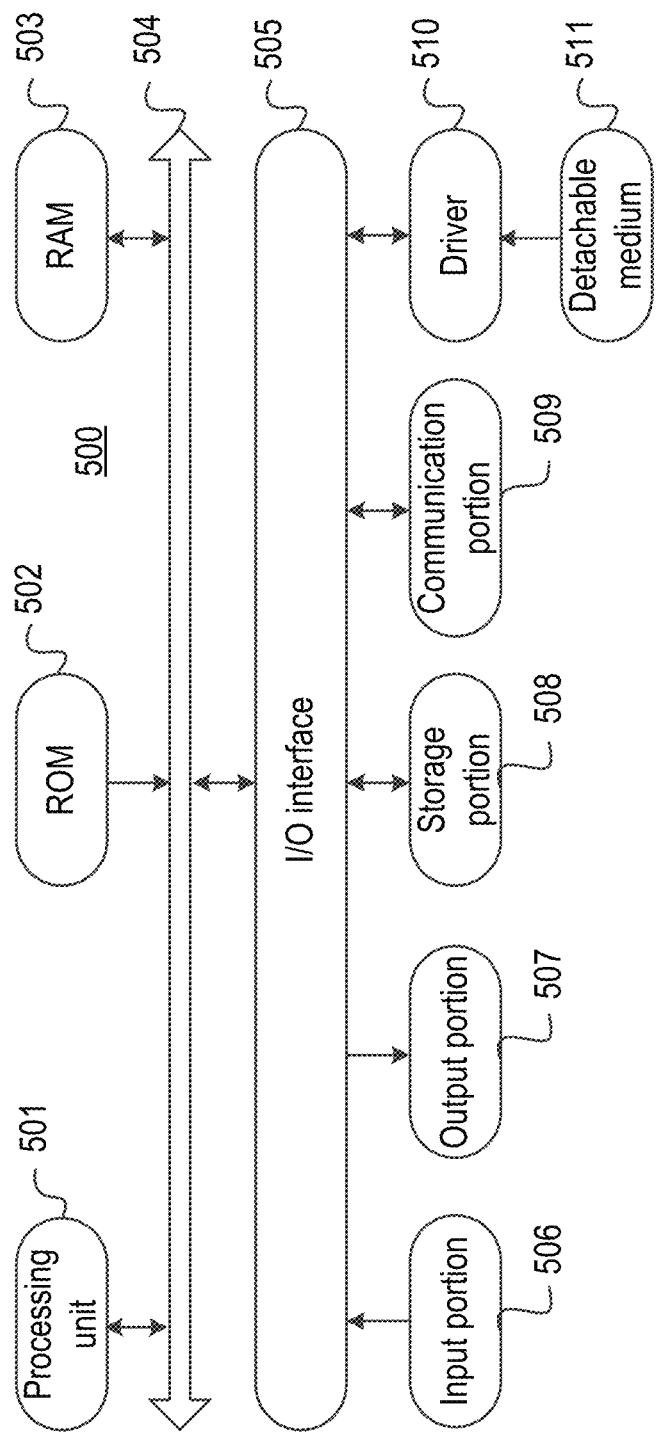
FIG. 5 is a block diagram illustrating a computer system suitable for implementing a behavior control method for a virtual live streaming character according to an embodiment of the disclosure.

FIG. 5 is a block diagram illustrating a computer system suitable for implementing the behavior control method according to an embodiment of the disclosure. As shown in FIG. 5, a computer system 500 includes a processing unit 501. The processing unit 501 may execute various processing in the aforementioned embodiments according to a program stored in a read-only memory (ROM 502) or a program loaded from a storage portion 508 to random access memory (RAM 503). The RAM 503 further stores various programs and data required for the operation of the computer system 500. The processing unit 501, the ROM 502, and the RAM 503 are connected to each other by means of a bus 504. An input/output interface (I/O interface 505) is also connected to bus 504.

The following components are connected to the I/O interface 505: an input portion 506 including a keyboard, a mouse, and the like; an output portion 507 including a cathode ray tube (CRT), a liquid crystal display (LCD), a loudspeaker, and the like; a storage portion 508 including a hard disk and the like; and a communication portion 509 including a network interface card such as a LAN card, a modem, and the like. The communication portion 509 executes communication processing by means of a network such as the Internet. A driver 510 is also connected to the I/O interface 505 according to requirements. A detachable medium 511 such as a magnetic disk, an optical disk, a magneto-optical disk, a semiconductor memory, etc. is mounted on the driver 510 according to requirements to facilitate mounting of a computer program read therefrom into the storage portion 508 performed according to requirements. The processing unit 501 may be implemented as a processing unit such as a CPU, a GPU, a TPU, an FPGA, an NPU, or the like.

The flowcharts and block diagrams in the accompanying drawings illustrate architectures, functions, and operations of possible implementations of the system, method, and computer program product according to various embodiments of the disclosure. In this regard, each block in the flowcharts or the block diagrams may represent a portion of a module, program segment, or code including one or more executable instructions for implementing specified logical functions. It should also be noted that in some alternative implementations, the functions denoted in the blocks can also occur in an order different from that denoted in the accompanying drawings. For example, two consecutive blocks can actually be performed substantially in parallel, and sometimes can also be performed in a reverse order. This depends on functions involved. It should also be noted that each block of the block diagrams and/or the flowcharts and combinations of blocks in the block diagrams and/or the flowcharts may be implemented in a dedicated hardware-based system for performing a specified function or operation or may be implemented by a combination of dedicated hardware and computer instructions.

The units or modules involved in the embodiments of the disclosure may be implemented by means of software and may also be implemented by means of hardware. The described units or modules may also be arranged in a processor, and in a certain case, the names of these units or modules are not considered to be a limitation to the units or modules.

In another aspect, the disclosure further provides a computer-readable storage medium. The computer-readable storage medium may be the computer-readable storage medium included in the apparatus in the embodiments and may also be a stand-alone computer-readable storage medium not having been assembled into a device. The computer-readable storage medium stores one or more programs. The programs are used by one or more processors to perform the methods described in the disclosure.

The above description is merely a description of the preferred embodiments of the disclosure and the applied technical principles. Those skilled in the art should understand that the inventive scope of the disclosure is not limited to technical solutions formed by combinations of the above technical features. In addition, the inventive scope should also cover other technical solutions formed by any combination of the above technical features or equivalent features thereof without departing from the concept of the disclosure, such as technical solutions formed by replacing the above features with technical features having similar functions disclosed in the disclosure (but not limited thereto).

What is claimed is:

1. A method comprising:
   acquiring viewer behavior data of a live streaming service;
   determining atmosphere data of the live streaming service based on the viewer behavior data by acquiring real-time behaviors of viewers, collecting real-time behavior data of the viewers when the real-time behaviors of the viewers meet a pre-configured triggering condition, processing the real-time behavior data of the viewers to acquire intention evaluation data and emotion evaluation data, calculating a frequency of occurrence of the intention evaluation data and the emotion evaluation data, using one or more pieces of intention evaluation data and emotion evaluation data having a highest frequency of occurrence as the atmosphere data of the live streaming service;
   acquiring scenario data of the live streaming service;
   generating behavior decision input data using the viewer behavior data, the atmosphere data, and the scenario data;
   performing multi-modal feedback behavior decision-making based on the behavior decision input data to acquire a behavior control instruction; and
   performing a corresponding behavior operation according to the behavior control instruction.

2. The method of claim 1, wherein performing multi-modal feedback behavior decision-making based on the behavior decision input data to acquire a behavior control instruction comprises:
   determining whether the behavior decision input data is pre-configured behavior decision input data in a pre-configured behavior decision input data set, wherein the pre-configured behavior decision input data set comprises the pre-configured behavior decision input data and a pre-configured behavior control instruction corresponding to the pre-configured behavior decision input data;
   in response to the behavior decision input data being the pre-configured behavior decision input data in the pre-configured behavior decision input data set, acquiring the pre-configured behavior control instruction corresponding to the pre-configured behavior decision input data, and using the pre-configured behavior control instruction as the behavior control instruction; and
   in response to the behavior decision input data not being the pre-configured behavior decision input data in the pre-configured behavior decision input data set, inputting the behavior decision input data into a behavior decision model to acquire behavior decision result data and generating the behavior control instruction based on the behavior decision result data.

3. The method of claim 2, wherein inputting the behavior decision input data into a behavior decision model to acquire behavior decision data and generating the behavior control instruction based on the behavior decision data comprises:
inputting the behavior decision input data into the behavior decision model to acquire multiple behavior decision results and corresponding probabilities; and
generating the behavior control instruction based on a behavior decision result having a highest probability.

4. The method of claim 2, further comprising training the behavior decision model by:
determining an initial behavior decision model;
acquiring a historical behavior decision data set, wherein the historical behavior decision data set comprises historical behavior decision input data and historical behavior decision result data corresponding to the historical behavior decision input data; and
training the initial behavior decision model by using the historical behavior decision input data as an input and using the corresponding historical behavior decision result data as an output to acquire the behavior decision model.

5. The method of claim 4, further comprising using the behavior decision input data and the corresponding behavior decision result data as new training data and adding the new training data to a historical behavior decision data set of the behavior decision model to train the behavior decision model.

6. The method of claim 2, further comprising correcting the behavior control instruction generated based on the behavior decision result data to acquire a corrected behavior control instruction.

7. The method of claim 6, wherein correcting the behavior control instruction generated based on the behavior decision result data comprises:
acquiring a correction behavior decision input data set, wherein the correction behavior decision input data set comprises correction behavior decision input data, a correction condition, and a correction behavior control instruction corresponding to the correction behavior decision input data;
determining whether the behavior decision input data is the correction behavior decision input data in the correction behavior decision input data set and determining whether the correction condition is met; and
in response to the behavior decision input data being the correction behavior decision input data in the correction behavior decision input data set, and if the correction condition is met, acquiring the correction behavior control instruction corresponding to the correction behavior decision input data and using the correction behavior control instruction as a behavior control instruction acquired after correcting the behavior control instruction.

8. The method of claim 1, wherein performing a corresponding behavior operation according to the behavior control instruction comprises one of:
calling, according to the behavior control instruction, a behavior component corresponding to a virtual live streaming character to perform the behavior operation, and
controlling, according to the behavior control instruction, the virtual live streaming character to perform the corresponding behavior operation.

9. A non-transitory computer-readable storage medium for tangibly storing computer program instructions capable of being executed by a computer processor, the computer program instructions defining steps of:
acquiring viewer behavior data of a live streaming service;
determining atmosphere data of the live streaming service based on the viewer behavior data by acquiring real-time behaviors of viewers, collecting real-time behavior data of the viewers when the real-time behaviors of the viewers meet a pre-configured triggering condition, processing the real-time behavior data of the viewers to acquire intention evaluation data and emotion evaluation data, calculating a frequency of occurrence of the intention evaluation data and the emotion evaluation data, using one or more pieces of intention evaluation data and emotion evaluation data having a highest frequency of occurrence as the atmosphere data of the live streaming service;
acquiring scenario data of the live streaming service;
generating behavior decision input data using the viewer behavior data, the atmosphere data, and the scenario data;
performing multi-modal feedback behavior decision-making based on the behavior decision input data to acquire a behavior control instruction; and
performing a corresponding behavior operation according to the behavior control instruction.

10. The non-transitory computer-readable storage medium of claim 9, wherein performing multi-modal feedback behavior decision-making based on the behavior decision input data to acquire a behavior control instruction comprises:
determining whether the behavior decision input data is pre-configured behavior decision input data in a pre-configured behavior decision input data set, wherein the pre-configured behavior decision input data set comprises the pre-configured behavior decision input data and a pre-configured behavior control instruction corresponding to the pre-configured behavior decision input data;
in response to the behavior decision input data being the pre-configured behavior decision input data in the pre-configured behavior decision input data set, acquiring the pre-configured behavior control instruction corresponding to the pre-configured behavior decision input data, and using the pre-configured behavior control instruction as the behavior control instruction; and
in response to the behavior decision input data being not the pre-configured behavior decision input data in the pre-configured behavior decision input data set, inputting the behavior decision input data into a behavior decision model to acquire behavior decision result data and generating the behavior control instruction based on the behavior decision result data.

11. The non-transitory computer-readable storage medium of claim 10, wherein inputting the behavior decision input data into a behavior decision model to acquire behavior decision data and generating the behavior control instruction based on the behavior decision data comprises:
inputting the behavior decision input data into the behavior decision model to acquire multiple behavior decision results and corresponding probabilities; and
generating the behavior control instruction based on a behavior decision result having a highest probability.

12. The non-transitory computer-readable storage medium of claim 10, the steps further comprising training the behavior decision model by:
- determining an initial behavior decision model;
- acquiring a historical behavior decision data set, wherein the historical behavior decision data set comprises historical behavior decision input data and historical behavior decision result data corresponding to the historical behavior decision input data; and
- training the initial behavior decision model by using the historical behavior decision input data as an input and using the corresponding historical behavior decision result data as an output to acquire the behavior decision model.

13. The non-transitory computer-readable storage medium of claim 12, further comprising using the behavior decision input data and the corresponding behavior decision result data as new training data and adding the new training data to a historical behavior decision data set of the behavior decision model to train the behavior decision model.

14. The non-transitory computer-readable storage medium of claim 10, the steps further comprising correcting the behavior control instruction generated based on the behavior decision result data to acquire a corrected behavior control instruction.

15. The non-transitory computer-readable storage medium of claim 14, wherein correcting the behavior control instruction generated based on the behavior decision result data comprises:
- acquiring a correction behavior decision input data set, wherein the correction behavior decision input data set comprises correction behavior decision input data, a correction condition, and a correction behavior control instruction corresponding to the correction behavior decision input data;
- determining whether the behavior decision input data is the correction behavior decision input data in the correction behavior decision input data set and determining whether the correction condition is met; and
- in response to the behavior decision input data being the correction behavior decision input data in the correction behavior decision input data set, and if the correction condition is met, acquiring the correction behavior control instruction corresponding to the correction behavior decision input data and using the correction behavior control instruction as a behavior control instruction acquired after correcting the behavior control instruction.

16. The non-transitory computer-readable storage medium of claim 9, wherein performing a corresponding behavior operation according to the behavior control instruction comprises one of:
- calling, according to the behavior control instruction, a behavior component corresponding to a virtual live streaming character to perform the behavior operation, and
- controlling, according to the behavior control instruction, the virtual live streaming character to perform the corresponding behavior operation.

17. An apparatus comprising:
a processor configured to:
- acquire viewer behavior data of a live streaming service;
- determine atmosphere data of the live streaming service based on the viewer behavior data by acquiring real-time behaviors of viewers, collecting real-time behavior data of the viewers when the real-time behaviors of the viewers meet a pre-configured triggering condition, processing the real-time behavior data of the viewers to acquire intention evaluation data and emotion evaluation data, calculating a frequency of occurrence of the intention evaluation data and the emotion evaluation data, using one or more pieces of intention evaluation data and emotion evaluation data having a highest frequency of occurrence as the atmosphere data of the live streaming service;
- acquire scenario data of the live streaming service;
- generate behavior decision input data using the viewer behavior data, the atmosphere data, and the scenario data;
- perform multi-modal feedback behavior decision-making based on the behavior decision input data to acquire a behavior control instruction; and
- perform a corresponding behavior operation according to the behavior control instruction.

18. The apparatus of claim 17, wherein performing multi-modal feedback behavior decision-making based on the behavior decision input data to acquire a behavior control instruction comprises:
- determining whether the behavior decision input data is pre-configured behavior decision input data in a pre-configured behavior decision input data set, wherein the pre-configured behavior decision input data set comprises the pre-configured behavior decision input data and a pre-configured behavior control instruction corresponding to the pre-configured behavior decision input data;
- in response to the behavior decision input data being the pre-configured behavior decision input data in the pre-configured behavior decision input data set, acquiring the pre-configured behavior control instruction corresponding to the pre-configured behavior decision input data, and using the pre-configured behavior control instruction as the behavior control instruction; and
- in response to the behavior decision input data being not the pre-configured behavior decision input data in the pre-configured behavior decision input data set, inputting the behavior decision input data into a behavior decision model to acquire behavior decision result data and generating the behavior control instruction based on the behavior decision result data.

* * * * *